United States Patent
Barthelemy et al.

[11] Patent Number: 6,007,099
[45] Date of Patent: Dec. 28, 1999

[54] VEHICLE INTRUSION ENERGY MANAGEMENT FRAME ELEMENT

[75] Inventors: Bruno Barthelemy, Ann Arbor; Hikmat Mahmood, Bloomfield Hills; Mohamed Ridha Baccouche, Ann Arbor, all of Mich.

[73] Assignee: Ford Global Technologies, Inc., Dearborn, Mich.

[21] Appl. No.: 08/980,567

[22] Filed: Dec. 1, 1997

[51] Int. Cl.⁶ .................................................... B62D 7/22
[52] U.S. Cl. ............................................................. 280/784
[58] Field of Search ................................... 280/784, 781, 280/797, 800; 296/189

[56] References Cited

U.S. PATENT DOCUMENTS

| | | | |
|---|---|---|---|
| 3,794,348 | 2/1974 | Fischer | 280/784 |
| 3,811,698 | 5/1974 | Glance | 280/784 |
| 3,827,712 | 8/1974 | Suzuki et al. | 280/784 |
| 4,781,398 | 11/1988 | Uebelstadt et al. | 280/784 |
| 5,184,868 | 2/1993 | Nishiyama | 280/784 |
| 5,372,216 | 12/1994 | Tsuji et al. | 280/784 X |
| 5,381,871 | 1/1995 | Ohta | 180/296 |
| 5,480,189 | 1/1996 | Davies et al. | 280/797 |

FOREIGN PATENT DOCUMENTS

| | | | |
|---|---|---|---|
| 2494204 | 5/1982 | France . | |
| 177673 | 2/1954 | Germany | 280/784 |
| 105881 | 6/1983 | Japan | 280/784 |

OTHER PUBLICATIONS

"Ford 's' Frame" report Baracos et al, Jan. 1969.

*Primary Examiner*—Christopher P. Ellis
*Attorney, Agent, or Firm*—David B. Kelley

[57] ABSTRACT

An automotive vehicle frame element includes a generally S shaped forward rail having a forward rail portion and a structurally reinforced rear rail portion substantially longitudinally displaced therefrom and a fold inducing area therebetween, a toe pan attached to the rail having a front wall projecting perpendicularly therefrom, the front wall having a point of separation from the rail at a location between the forward and rear rail portions, and the fold inducing area located longitudinally forward of the point of separation of the toe pan portion from the rail and at the point where the structurally reinforced rear rail portion transitions into the forward rail portion.

12 Claims, 2 Drawing Sheets

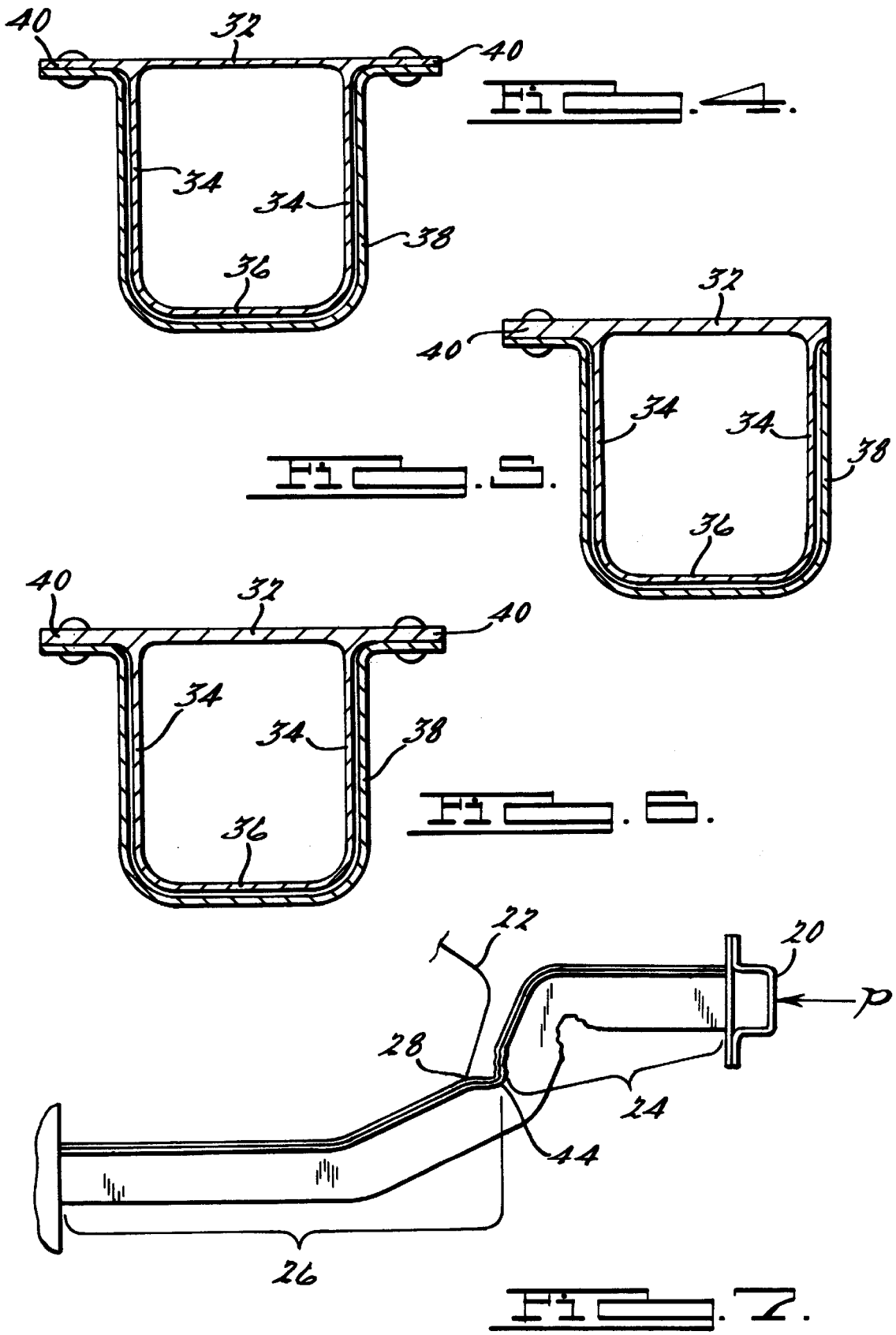

VEHICLE INTRUSION ENERGY MANAGEMENT FRAME ELEMENT

FIELD OF THE INVENTION

The present invention relates to an automotive vehicle frame element, and more specifically, to intrusion energy management utilizing such an element.

BACKGROUND OF THE INVENTION

Conventional vehicle frames have a pair of rails running longitudinally of the vehicle. The rails not only serve as a structural base around which a vehicle is built, but also serve as a mechanism for absorbing an externally applied intrusive load. Intrusion energy management plays a major role in the design of an automotive vehicle. The goal of many vehicle designers is to have the vehicle absorb the total amount of kinetic energy resulting from the application of such a load. Conventional rail designs have a number of aspects in common to serve this end. The forward rail portion extending from the front of the engine block to the bumper is designed to axially crumple in accordion like fashion. The remaining energy is then typically absorbed by the rear rail portion, extending the length of the engine block, by means of plastic bending deformation. Generally the rail folds upward at the point of greatest eccentricity from the applied load. This point is typically beneath the toe pan area of the passenger compartment.

The toe pan area is rigidly attached to the rails of an automobile. This area typically rides up the lower or rear portion of the rail and separates from the rail at the midpoint just before transitioning into the forward or upper rail. The plastic bending deformation of the rear rail, in conventional designs, occurs at the base of the curve of the rear rail or just beneath a vehicle driver position. When this bending deformation occurs the rail is displaced upward and intrudes into the toe pan area of the passenger compartment.

One approach to avoid this intrusion is to increase the structural rigidity of the rear rail section. With this enhanced rigidity, the rear rail section resists deforming altogether. The advantage with this design being that the rear rail does not deflect upward into the toe pan area upon application of intrusive energy. However, because the rail will not deflect and absorb the remaining energy, the rail acts to transmit the remaining energy to other portions of the vehicle which affects their design.

Accordingly, it is seen that a need exists in the art for a vehicle intrusion energy management frame element which absorbs the kinetic energy resulting from an external load and prevents the intrusion of the rail members into the toe pan area.

SUMMARY OF THE INVENTION

Responsive to the deficiencies in the prior art, the present invention provides an automotive vehicle frame element including a generally S shaped forward rail having forward and rear rail portions substantially longitudinally displaced therefrom and a plastic deformation inducing area therebetween so as to induce rail folding at a predetermined location along the rail upon application of an external longitudinal load.

According to feature the forward rail portion has a predetermined thickness and the rear rail portion has a predetermined thickness a predetermined degree greater than the forward rail portion thickness.

According to a further feature of the present invention the plastic deformation inducing area is at the transition point between the forward rail portion thickness and the rear rail portion thickness.

An advantage of the present invention is that the present frame element absorbs the kinetic energy resulting from an external load by allowing for plastic deformation and yet prevents the intrusion of the rail members into the toe pan area.

BRIEF DESCRIPTION OF THE DRAWINGS

Other features and advantages of the present invention will become apparent to those skilled in the automotive vehicle body related arts upon reading the following description with reference to the accompanying drawings, in which:

FIG. 4 is a cross section of the forward rail of FIG. 3 taken along the line 4—4 according to the present invention;

FIG. 5 is a cross section of the forward rail of FIG. 3 taken along the line 5—5 according to the present invention;

FIG. 6 is a cross section of the forward rail of FIG. 3 taken along the line 6—6 according to the present invention; and FIG. 7 is a side view of a forward rail after application of an external load according to the present invention.

DETAILED DESCRIPTION OF THE PREFERRED EMBODIMENT

Figure 1:
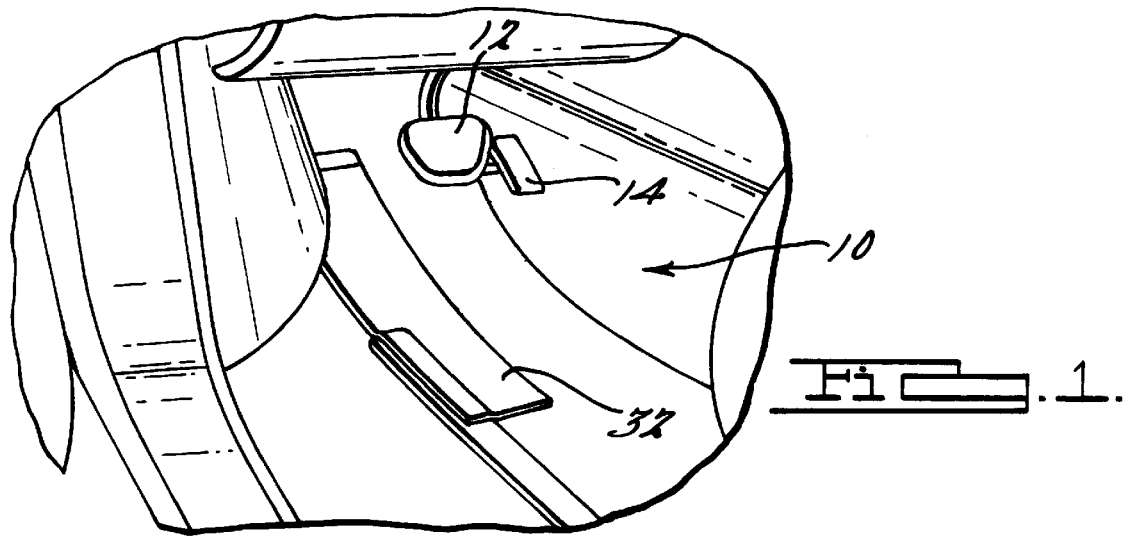
FIG. 1 is a partial view of an interior toe pan area of an automotive vehicle.
Figure 2:
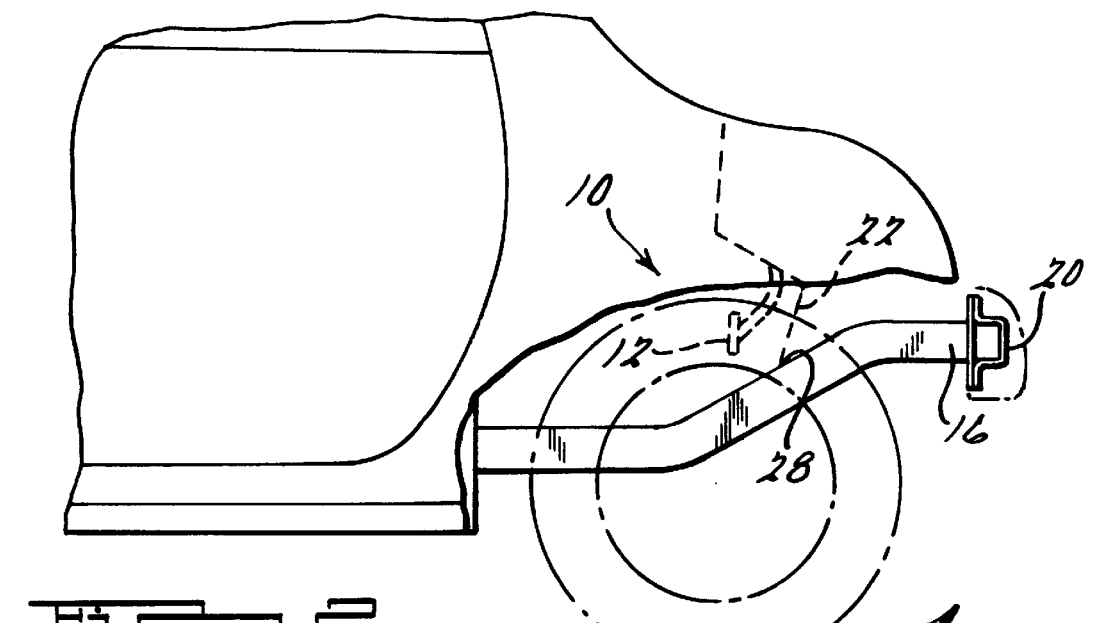
FIG. 2 is a partial side and cut away view of a front end of an automotive vehicle according to the present invention.

Turning now to the drawings, and in particular to FIGS. 1 and 2 thereof, a toe pan area 10 of an automotive vehicle is shown. The toe pan area 10 is the area where a vehicle operator's feet rest while driving and where a brake pedal 12 and an accelerator pedal 14 are located. The toe pan area 10 is supported by a vehicle chassis having a chassis frame assembly. The frame assembly includes identically constructed and symmetrically arranged left and right rails. One such rail 16 is shown in FIG. 2. The rails extend in a substantially straight longitudinal direction typically terminating in the front of the vehicle at a bumper 20.

As shown in FIG. 2, the toe pan area 10, has a generally vertical front wall 22 separating the passenger compartment from the engine compartment.

Figure 3:
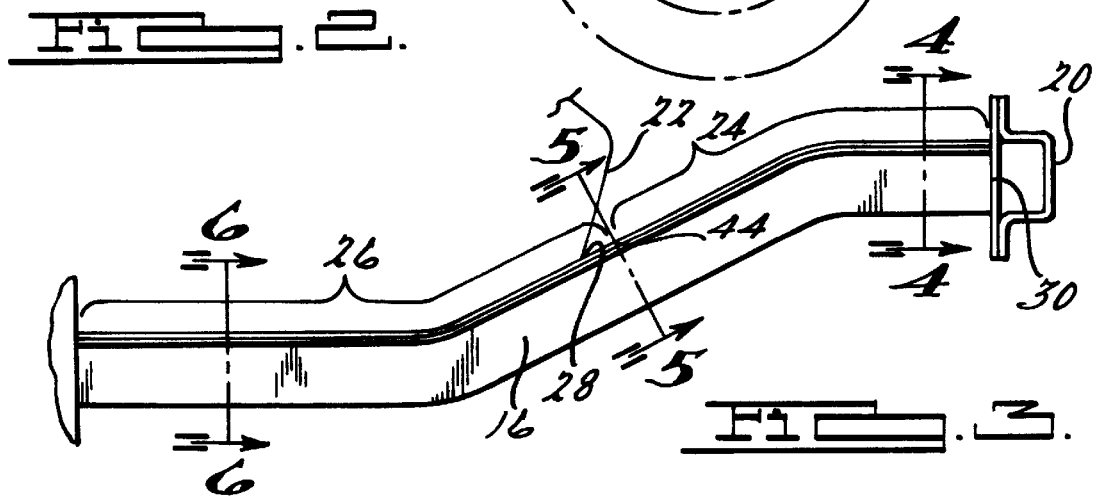
FIG. 3 is a side view of a forward rail according to the present invention.

As shown in FIG. 3, the forward end of the rail 16 is a generally S shaped member having a forward and rearward portion, 24 and 26 respectively. The toe pan area 10 is rigidly mounted to the rail 16 by conventional means (not shown). The front wall 22 has a point of separation 28 from the rail 16 located a predetermined distance longitudinally rearward of a transition point 44, as shown in FIG. 5, between the forward and rearward portions, 24 and 26 respectively. The transition point 44 is explained in further detail below. A bumper 20 may be mounted directly to the front end 30 of the forward portion 24.

As shown in FIGS. 4 and 6, the rail 16 has a generally uniform, hat shaped, cross section and is preferably formed from steel. The rail 16 has a top side 32, a pair of side walls 34, a base 36, and a support 38. The top side 32 extends beyond the side walls 34 to form flanges 40. The support 38 also has a hat shaped cross section and is overlapped in spoon like fashion with the rail 16. The rail 16 and support 38 are preferably welded together.

The rail 16 of FIG. 4 has a forward portion 24, a rearward portion 26, and a transition point 44 therebetween. The forward portion 24 preferably has a top side 32 having a thickness of 1.7 millimeters (mm) and side wall thickness' of 2.0 mm. As shown in FIG. 5, the transition point 44 between the forward and rearward portions, 24 and 26 respectively, has a top side 32 having an increased thickness of preferably 3.7 mm and side wall thickness' of 2.0 mm. Preferably at this transition point 44, one of the side walls 34 mates flush with the top side 32 so as to eliminate one of the flanges 40. The transition point 44 may be characterized as having only one flange 40 and being the point where the top side 32 thickness changes from 1.7 mm to 3.7 mm. When the rail 16 is viewed from the top the eliminated flange would appear as a notch and could be triangular, semicircular, or any configuration desired depending on design requirements. Longitudinally rearward of the transition area of FIG. 5 and as shown in FIG. 6, the rail 16 has a cross section with preferably a pair of flanges 38 and 40, a top side 32 thickness of 3.7 mm, and side wall 34 thickness' of 2.0 mm.

The rails 16 of the frame assembly are constructed to support the structural load of a vehicle body in a conventional fashion. The rails 16 act as an energy management device only when an intrusive load is applied which exceeds a predetermined minimum. An impact against the bumper 20, as shown in FIG. 7, may constitute such a load. In the event the intrusive load "P" is severe enough, the rails 16 will plastically deform in a predetermined fashion. The transition point 44 of FIG. 5, having only one flange 40 and a top side thickness of 1.7 mm, will act as a "trigger" allowing plastic deformation to occur in this area. The plastically deformed transition area then becomes an axis of rotation about which the forward portion 24 of the rail 16 is upwardly displaced.

This structure is advantageous for a number of reasons. First, the plastic deformation occurs longitudinally forward of the point of separation 28 of the front wall 22 from the rail 16. Therefore, the front portion 24 does not intrude into the toe pan area 10 when plastically deformed upward. Further, because the rail 16 is allowed to deform, energy from the intrusive load is absorbed rather than transmitted to the vehicle occupants.

Only one embodiment of an intrusive energy management frame element for an automotive vehicle of the present invention has been described. Those skilled in the automotive mechanical arts will appreciate that others may be possible without departing from the scope of the following claims. For example, those skilled in the art will understand that the herein described intrusion energy management frame element, while disclosed in an environment of a body on frame construction, would be equally applicable to a unitized body vehicle construction.

We claim:

1. An automotive vehicle energy management frame element for a vehicle having a toe pan portion with a generally vertically extending front wall comprising:

a generally S shaped forward rail having forward and rear rail portions substantially longitudinally spaced and a fold inducing area between the portions;

the rail having a point of separation from the front wall at a predetermined location between the forward and rear rail portions; and the fold inducing area being located longitudinally forward of the point of separation.

2. A frame element according to claim 1 wherein, the forward rail has a generally hat shaped cross section with a base, a pair of side walls, and a top extending beyond the side walls to form a pair of laterally spaced flanges.

3. A frame element according to claim 2 wherein, the forward rail portion has a predetermined thickness.

4. A frame element according to claim 3 wherein, the rear rail portion has a predetermined thickness a predetermined degree greater than the forward rail portion thickness.

5. A frame element according to claim 4 wherein, the fold inducing area is at the transition point between the forward rail portion thickness and the rear rail portion thickness.

6. A frame element according to claim 2 wherein, the fold inducing area has only one flange.

7. An automotive vehicle intrusion energy management frame element for a vehicle having a toe pan portion with a generally vertically extending front wall, comprising:

a generally S shaped forward rail having a forward rail portion and a structurally reinforced rear rail portion substantially longitudinally spaced and a fold inducing area between the portions;

the rail having a point of separation from the front wall at a predetermined location between the forward and rear rail portions; and the fold inducing area being located longitudinally forward of the point of separation and at the point where the structurally reinforced rear rail portion transitions into the forward rail portion.

8. A frame element according to claim 7 wherein, the forward rail has a generally hat shaped cross section with a base, a pair of side walls, and a top extending beyond the side walls to form a pair of laterally spaced flanges.

9. A frame element according to claim 8 wherein, the forward rail portion has a predetermined thickness.

10. A frame element according to claim 9 wherein, the rear rail portion has a predetermined thickness a predetermined degree greater than the forward rail portion thickness.

11. A frame element according to claim 10 wherein, the fold inducing area is at the transition point between the forward rail portion thickness and the rear rail portion thickness.

12. A frame element according to claim 7 wherein, the fold inducing area has only one flange.

* * * * *